(12) United States Patent
Schwarz et al.

(10) Patent No.: US 11,118,674 B2
(45) Date of Patent: Sep. 14, 2021

(54) METHOD FOR OPERATING A TRANSMISSION

(71) Applicant: ZF Friedrichshafen AG, Friedrichshafen (DE)

(72) Inventors: Andreas Schwarz, Langenargen (DE); Thomas Kurz, Langenargen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 16/764,905

(22) PCT Filed: Nov. 7, 2018

(86) PCT No.: PCT/EP2018/080405
§ 371 (c)(1),
(2) Date: May 18, 2020

(87) PCT Pub. No.: WO2019/101514
PCT Pub. Date: May 31, 2019

(65) Prior Publication Data
US 2020/0340576 A1    Oct. 29, 2020

(30) Foreign Application Priority Data
Nov. 23, 2017 (DE) ...................... 10 2017 221 000.1

(51) Int. Cl.
*F16H 59/50* (2006.01)
*F16H 59/56* (2006.01)
*F16H 61/02* (2006.01)

(52) U.S. Cl.
CPC ......... *F16H 59/56* (2013.01); *F16H 61/0213* (2013.01); *B60Y 2200/411* (2013.01); *B60Y 2200/412* (2013.01); *F16H 2061/0234* (2013.01)

(58) Field of Classification Search
CPC .......... F16H 59/44; F16H 59/50; F16H 59/56; F16H 59/70; F16H 2059/147;
(Continued)

(56) References Cited

U.S. PATENT DOCUMENTS 9,097,344 B2    8/2015    Hoff et al.
2004/0172184 A1*    9/2004    Vukovich ............ B60W 10/113
                                                                701/51
(Continued)

FOREIGN PATENT DOCUMENTS

DE    10 2011 006 386 A1    10/2012
DE    11 2013 005 124 T5    8/2015
EP       3 006 782 A1    4/2016

OTHER PUBLICATIONS

International Search Report Corresponding to PCT/EP2018/080405 dated Jan. 23, 2019.
(Continued)

*Primary Examiner* — Edwin A Young
(74) *Attorney, Agent, or Firm* — Finch & Maloney, PLLC; Michael Bujold; Jay Franklin

(57) ABSTRACT

A control unit (11) that outputs a shift signal to a transmission (4) when the control unit recognizes that the bucket (1) is in a loading position, such that the transmission (4) shifts not to the next-higher gear ratio, but to a further, even higher, gear ratio.

11 Claims, 1 Drawing Sheet

(58) Field of Classification Search
CPC ............. F16H 61/0204; F16H 61/0213; F16H 2061/0234; F16H 2061/0444; F16H 2306/14; B60Y 2200/411; B60Y 2200/412
See application file for complete search history.

(56) References Cited

U.S. PATENT DOCUMENTS

| | | | |
|---|---|---|---|
| 2010/0145581 A1* | 6/2010 | Hou | B60W 10/11 |
| | | | 701/50 |
| 2016/0167647 A1* | 6/2016 | Yamada | E02F 9/202 |
| | | | 701/50 |
| 2017/0121946 A1 | 5/2017 | Cai et al. | |

OTHER PUBLICATIONS

Written Opinion Corresponding to PCT/EP2018/080405 dated Jan. 23, 2019.

* cited by examiner

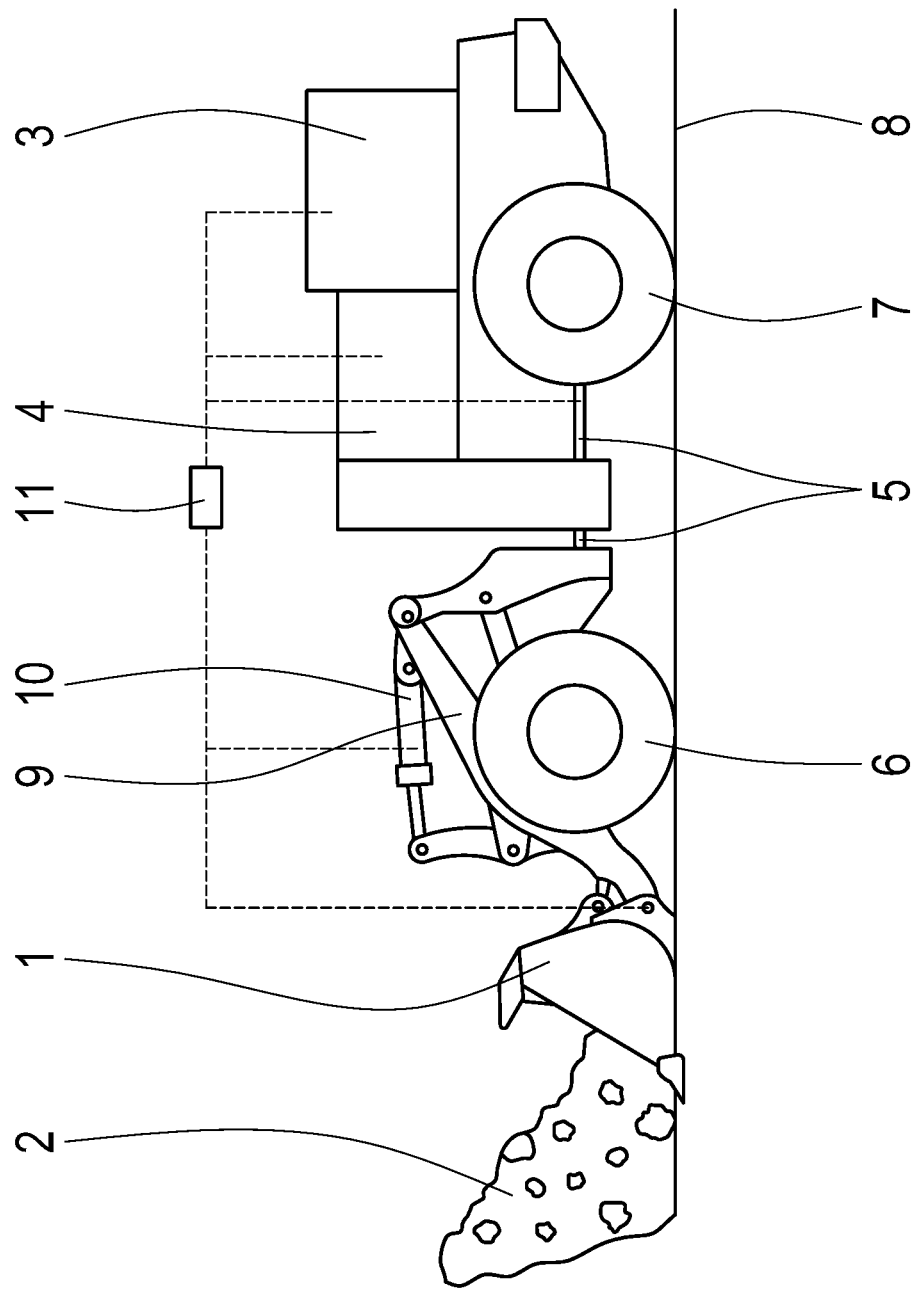

METHOD FOR OPERATING A TRANSMISSION

This application is a National Stage completion of PCT/EP2018/080405 filed Nov. 7, 2018, which claims priority from German patent application serial no. 10 2017 221 000.1 filed Nov. 23, 2017.

FIELD OF THE INVENTION

The invention relates to a method for operating a transmission and a control unit for a transmission.

BACKGROUND OF THE INVENTION

DE 112013005124 T5 discloses an automatic shift control system for a drive-train, and a method for it. In this case, the transmission of the wheel loader is shifted when the vehicle has not yet reached the pile with its bucket. If the vehicle recognizes that the bucket has been brought to an unloading condition or to a material collection condition, a gearshift is automatically carried out to the next-lower gear. Since the automatic downshift takes place already before the time when the driver of the vehicle expects a downshift, this makes for uncomfortable driving of the vehicle.

SUMMARY OF THE INVENTION

The purpose of the present invention is to further improve the method for operating the transmission known from the prior art.

This objective is achieved by a method of the type concerned that also comprises the characterizing features of the principal claim.

According to the invention, signals are delivered to a control unit, by virtue of which the control unit can recognize the position of the bucket of the working machine. In this case the possibility exists of detecting the position of the bucket and the position of the lifting frame by means of a plurality of sensors. However, it is also possible to recognize the position of the bucket by means of one sensor and further operating parameters. If the control unit recognizes that the bucket is in a loading position, then with reference to further operating parameters the control unit checks whether a downshift point has been reached. In this context loading position means that the lifting mechanism or lifting frame is in a lowered position close to the ground and the bucket is horizontal. In this position of the bucket, the wheel loader normally drives into the pile, for example a pile of earth or gravel. A downshift point is normally initiated as a function of further operating parameters, for example as a function of the rotational speed of the drive motor and/or a torque from the drive motor. For example, the determination of a downshift point is described in DE 102011006386 A1. Since the vehicle always carries out a downshift with these operating parameters, the vehicle driver perceives the moment of this downshift as the usual time. According to the invention, however, when the loading position of the bucket is recognized no downshift to the previously normally set gear ratio is carried out, but the electronic control unit emits a signal calling for a downshift to a further, higher gear ratio. Since the transmission is downshifted to a further, higher gear ratio, the traction force required is immediately available to the vehicle and the vehicle does not come to a standstill while driving into the pile and filling the bucket. However, if the vehicle only carried out a normal downshift, i.e. downshift only to the next-higher gear ratio, it would come to a standstill during the downshift since the deceleration of the vehicle while it drives into the pile is very large. The next downshift would then first take place while at a standstill. Rapid and effective filling of the bucket would then not be possible. But since, by virtue of the invention, the downshift is carried out to the higher gear ratio, the vehicle no longer comes to a standstill.

If the vehicle has a powershift transmission with several gears and the vehicle is in the third gear while driving into the pile, then when the loading position of the bucket has been recognized and the downshift point has been reached, the shift is carried out not from the third to the second gear but directly from the third to the first gear.

It is also possible to make the downshift to the further, even higher gear ratio depend on further parameters.

In addition to recognizing the position of the bucket and the fact that the downshift point has been reached, the control unit can also check whether the brake pedal has been actuated and whether this actuation is less than a predefined amount.

If that criterion is satisfied, the downshift according to the invention takes place. If the accelerator pedal has not been actuated at all, then there is no downshift accordance to the invention, but a downshift to the next gear.

It is also possible to additionally or optionally check whether the torque at the transmission input is thus the output torque of the drive motor is greater than a previously defined threshold. This makes it possible to detect whether the vehicle is in overdrive operation. If the vehicle is in overdrive operation the downshift according to the invention should not be carried out.

Furthermore, it is possible, in addition or optionally, when a hydrodynamic torque converter with a converter lock-up clutch is present and the converter lock-up clutch is closed, to check whether the torque on the transmission input, and thus the output torque of the drive motor, is less than a previously defined percentage of the maximum output torque of the drive motor. If this criterion is not satisfied, then the downshift according to the invention to the higher transmission ratio should not be carried out.

In a further embodiment it should optionally or additionally be checked whether the speed of the vehicle is lower than a predefined vehicle speed. If the vehicle speed is higher than the predefined vehicle speed, then the downshift according to the invention to the larger transmission ratio should not be carried out.

The method according to the invention and the product according to the invention is used in a working machine such as a wheel loader. However, the method according to the invention and the product according to the invention can be used in any mobile vehicle that has a movable bucket, such as a backhoe-loader.

The transmission used can be any type of transmission with a plurality of gear ratios, also including a continuously variable power-split transmissions with a hydraulic or electric power branch and a mechanical power branch, as well as purely hydrostatically adjustable transmissions and any type of automatic or manual shift transmission, with or without a hydrodynamic torque converter.

BRIEF DESCRIPTION OF THE DRAWING

Further characteristics emerge from the description of the sole FIGURE. The sole FIGURE shows a diagrammatic view of a wheel loader having a control unit for operating a transmission according to a method of the invention.

DETAILED DESCRIPTION OF THE PREFERRED EMBODIMENTS

The sole FIGURE shows a wheel loader with a bucket 1, in which the bucket 1 is being moved straight into the pile 2. A drive motor 3, for example an internal combustion engine or an electric motor, drives drive shafts 5 via a transmission 4, by means of which the front wheels 6 and the rear wheels 7 are driven. The wheel loader is on the ground 8. The bucket 1 is connected to the chassis of the wheel loader by a lifting frame 9. The lifting frame 9 can be moved by cylinders 10. The transmission 4 is designed as a transmission with changeable gear ratios. It is possible for the transmission 4 to be in the form of a powershift transmission with a plurality of fixed gear ratios and a torque converter with a torque converter lock-up clutch. However, the transmission can also be in the form of a hydrostatic-mechanical power-split transmission or a hydrostatic transmission. Sensors are attached to the bucket 1 and the lifting frame 9, by means of which a loading position of the bucket 1 can be detected. The loading position of the bucket is reached when the lifting frame 9 is lowered and the bucket 1 is lying on the ground 8. Here, the bucket 1, as shown in the FIGURE, is arranged horizontally so that it can be pushed into the pile 2. If, as in the prior art, the wheel loader drives into the pile 2 at a higher speed, for example in third gear, with the bucket 1 in the loading position, the wheel loader is decelerated very rapidly. According to the prior art, when the downshift point is reached the automatic gear selection system downshifts by one gear, so the wheel loader is shifted to the second gear. But since the deceleration is very large, during this downshift to the second gear the vehicle comes to a standstill and the next downshift to the first gear only takes place when the vehicle is already at a standstill. Due to this longer shifting time according to the prior art, the driver of the vehicle cannot fill the bucket quickly and effectively.

According to the present invention, however, in addition the position of the lifting frame 9 and/or the bucket 1 are also taken into account when, with reference to the operating parameters of the vehicle, the control unit 11 recognizes that a downshift, i.e. a shift to a higher gear ratio is needed. If the control unit 11 recognizes that the bucket is in the loading position and, with reference to the other operating parameters, that a gear downshift would be needed, the control unit 11 emits a shift signal to the transmission 4 which causes the transmission 4 to downshift to a further, even higher gear ratio and not to the gear ratio normally chosen with reference to the operating parameters.

It is also possible to take account of further criteria as triggering criteria for the shift to the further, higher gear ratio.

Thus, for example, when using a transmission 4 which is in the form of a powershift, multi-gear manual transmission having a hydrodynamic torque converter and a converter lock-up clutch, it is possible for the control unit to initiate the downshift to the further, even higher gear ratio only when the bucket 1 is in the loading position and an actuation movement of a brake pedal is smaller than a predefined actuation movement and when the torque on the transmission input, i.e. the torque from the drive motor 3, is smaller when the converter lock-up clutch is closed than a predefined percentage of the maximum drive output torque of the drive motor 3 and the speed of the vehicle is lower than a predefined vehicle speed. Only when all of these conditions are fulfilled does the control unit 11, which for example can be the transmission control unit, call for a downshift to a further, even higher gear ratio instead of calling for the normal downshift. In that way the required traction force is immediately available and the vehicle does not come to a standstill while filling the bucket 1.

If, for example, the vehicle drives into the pile 2 in third gear, normally a downshift to second gear would take place. However, if the above-mentioned parameters are satisfied, for example the bucket is in a loading position, then the control unit at once calls for a downshift into first gear so that the transmission does not shift to the second gear, but directly into first gear. Thus, the shift takes place at a time expected by the driver and the vehicle does not stop when driving into the pile 2.

INDEXES

1 Bucket
2 Pile
3 Drive motor
4 Transmission
5 Driveshafts
6 Front wheels
7 Rear wheels
8 Ground
9 Lifting frame
10 Cylinder
11 Control unit

The invention claimed is:

1. A method for operating a transmission with a plurality of gear ratios that are engagable, in which a signal that corresponds to a position of a bucket of a working machine vehicle is sent to a control unit and the control unit calls for a new gear ratio of the transmission to be engaged based on a currently engaged gear ratio and operating parameters of the vehicle, the method comprising:
   receiving a signal, via the control unit, that the bucket is in a loading position; and
   calling for a downshift, via the control unit, to a further, even higher, gear ratio and hence an increase of the gear ratio when the operating parameters which initiate a downshift exist.

2. The method for operating a transmission according to claim 1, further comprising calling for the downshift to the further, even higher, gear ratio only when the control unit recognizes that the vehicle is not in overdrive operation.

3. The method for operating a transmission according to claim 1, further comprising calling for the downshift to the further, even higher, gear ratio, only when the control unit recognizes that a brake pedal of the vehicle is actuated by less than a predefined amount.

4. The method for operating a transmission according to claim 1, further comprising calling for the downshift to the further, even higher, gear ratio only when the control unit recognizes that torque, from a drive motor of the vehicle on a transmission input, is greater than a predefined value.

5. The method for operating a transmission according to claim 1, further comprising calling for the downshift to the further, even higher, gear ratio only when the control unit recognizes that a speed of the vehicle is lower than a predefined speed.

6. The method for operating a transmission according to claim 1, further comprising calling for the downshift to the further, even higher, gear ratio only when the control unit recognizes that, when a lock-up clutch of a hydrodynamic torque converter is engaged, torque from a drive motor of the vehicle on a transmission input is smaller than a predefined value.

7. A control unit for a transmission with a plurality of gear ratios that are engagable such that the control unit receives a signal which corresponds to a position of a bucket of a working machine vehicle and, starting from an engaged gear ratio and on a basis of operating parameters, the control unit calls for a new gear ratio to be engaged in the transmission, and when operating parameters exist which initiate a downshift and hence an increase of the gear ratio, the control unit calls for a downshift to a further, even higher, gear ratio if the control unit receives a signal that the bucket is in a loading position.

8. The control unit according to claim 7, wherein the downshift to the further, even higher, gear ratio is only called for when the control unit recognizes that the vehicle is not operating in overdrive and the control unit recognizes that a brake pedal of the vehicle is actuated by less than a predefined amount, and the control unit recognizes that torque, from a drive motor of the vehicle, on a transmission input, is larger than a predefined value, and the control unit recognizes that a speed of the vehicle is lower than a predefined speed, and the control unit recognizes that the torque, from the drive motor of the vehicle on the transmission input when a lock-up clutch of a hydrodynamic torque converter is engaged, is smaller than a predefined value.

9. A working machine vehicle with a bucket and a control unit and a transmission with a plurality of gear ratios that are engagable, the control unit being configured to receive a signal that corresponds to a position of the bucket of the vehicle, and starting from a currently engaged gear ratio and on a basis of operating parameters the control unit calling for a new gear ratio of the transmission to be engaged, and when operating parameters exist that initiate a downshift and hence an increase of the gear ratio, the control unit calling for a downshift to a further, even higher, gear ratio when the control unit receives a signal that the bucket is in a loading position.

10. The vehicle according to claim 9, wherein the downshift to the further, even higher, gear ratio is only called for when the control unit recognizes that the vehicle is not operating in overdrive, and the control unit recognizes that a brake pedal of the vehicle is actuated by less than a predefined amount, and the control unit recognizes that torque, from a drive motor of the vehicle on a transmission input, is larger than a predefined value, and the control unit recognizes that a speed of the vehicle is lower than a predefined speed, and the control unit recognizes that the torque, from the drive motor of the vehicle on the transmission input when a lock-up clutch of a hydrodynamic torque converter is closed, is smaller than a predefined value.

11. The vehicle according to claim 9, wherein the vehicle is a wheel loader with a powershiftable transmission, a hydrodynamic torque converter having a lock-up clutch is arranged between a drive motor and the transmission, and instead of downshifting from a currently engaged third gear to a new second gear, a downshift is carried out directly to a first gear having a highest gear ratio.

* * * * *